United States Patent
Moyer (10) Patent No.: US 11,822,479 B2
(45) Date of Patent: Nov. 21, 2023

(54) HISTORY-BASED SELECTIVE CACHE LINE INVALIDATION REQUESTS

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/514,811

(22) Filed: Oct. 29, 2021

(65) Prior Publication Data

US 2023/0137467 A1    May 4, 2023

(51) Int. Cl.
*G06F 12/08* (2016.01)
*G06F 12/0891* (2016.01)

(52) U.S. Cl.
CPC .... G06F 12/0891 (2013.01); *G06F 2212/683* (2013.01)

(58) Field of Classification Search
CPC ........ G06F 12/0891; G06F 2212/683
See application file for complete search history.

(56) References Cited

U.S. PATENT DOCUMENTS

| | | | |
|---|---|---|---|
| 6,725,337 B1 | 4/2004 | Tan et al. | |
| 7,496,726 B1 * | 2/2009 | Nussbaum | G06F 9/526 |
| | | | 711/119 |
| 2011/0099335 A1 | 4/2011 | Scott et al. | |
| 2011/0208915 A1 | 8/2011 | Bannon et al. | |
| 2019/0347124 A1 | 11/2019 | Payet et al. | |
| 2020/0159665 A1 | 5/2020 | Berger et al. | |
| 2021/0240619 A1 * | 8/2021 | Earnshaw | G06F 12/0802 |

OTHER PUBLICATIONS

Pierce, J. & Mudge, T., "The Effect of Speculative Execution on Cache Performance", Proceedings of the International Parallel Processing Symposium, Apr. 1994, 8 pgs.

* cited by examiner

*Primary Examiner* — Masud K Khan
(74) *Attorney, Agent, or Firm* — Volpe Koenig (57) ABSTRACT

Techniques for performing cache operations are provided. The techniques include recording an indication that providing exclusive access of a first cache line to a first processor is deemed problematic; detecting speculative execution of a store instruction by the first processor to the first cache line; and in response to the detecting, refusing to provide exclusive access of the first cache line to the first processor, based on the indication.

20 Claims, 6 Drawing Sheets

HISTORY-BASED SELECTIVE CACHE LINE INVALIDATION REQUESTS

BACKGROUND

Modern microprocessors implement a wide array of features for high throughput. Some such features include having highly parallel architectures and performing execution speculatively. Improvements to such features are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for performing cache operations are provided. The techniques include recording an indication that providing exclusive access of a first cache line to a first processor is deemed problematic; detecting speculative execution of a store instruction by the first processor to the first cache line; and in response to the detecting, refusing to provide exclusive access of the first cache line to the first processor, based on the indication.

Figure 1:
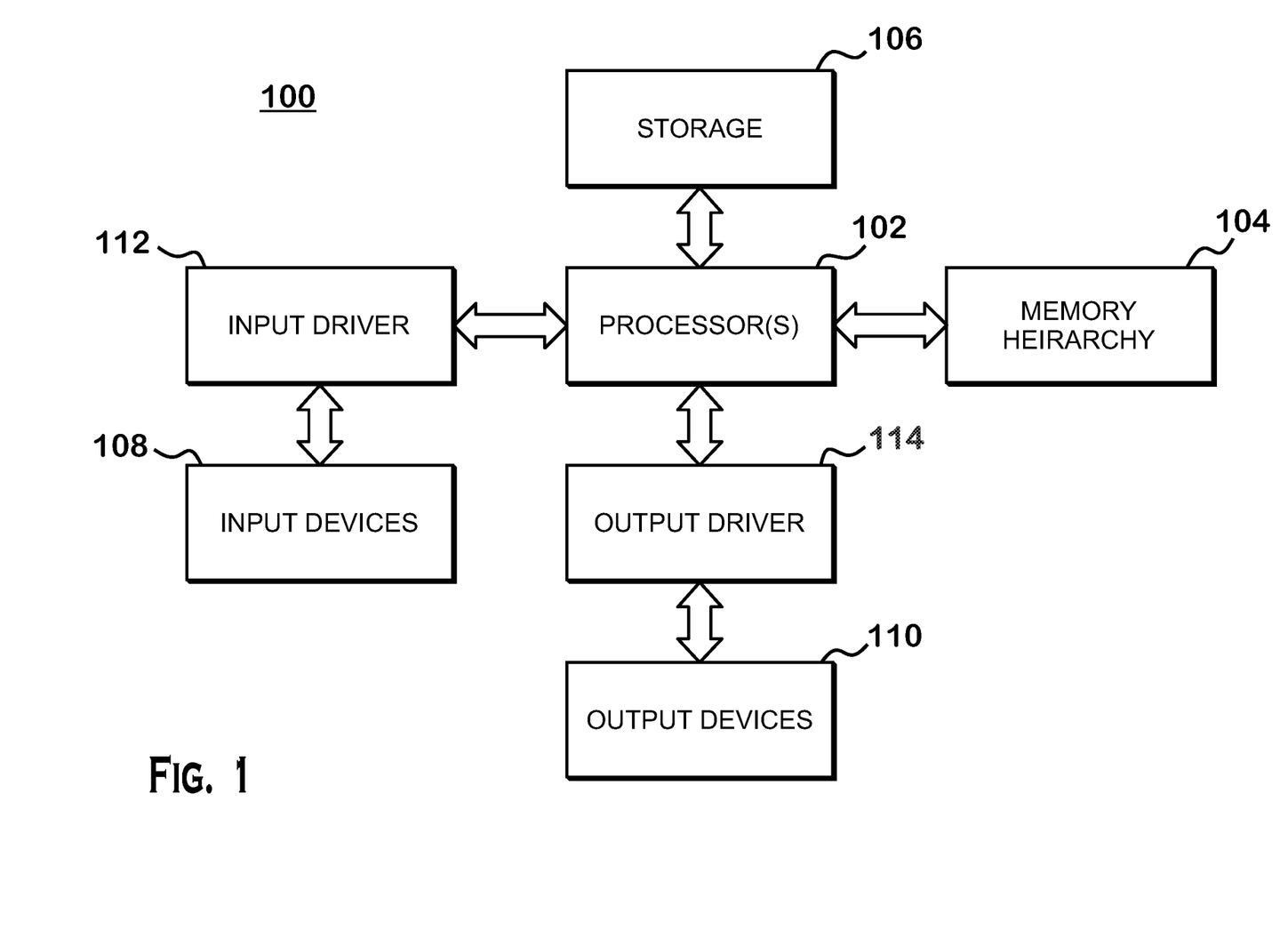
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types.

In some examples, the elements of the memory hierarchy 104 are arranged in a hierarchy that includes the elements of the one or more processors 102. Examples of such an arrangement is provided in FIGS. 3 and 4A-4D.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
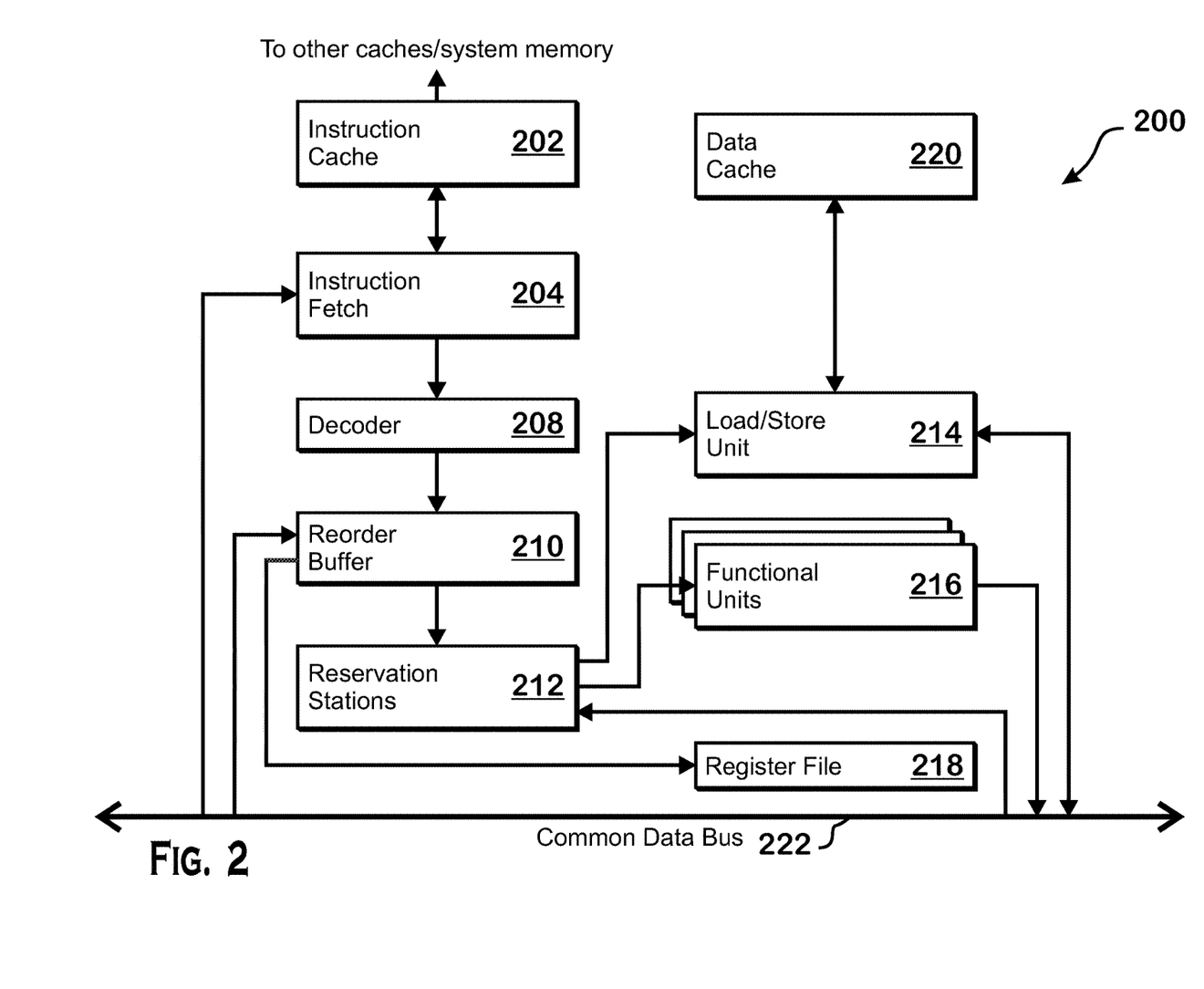
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/ store unit 214 also reads data from the common data bus 222. For example, the load/store unit 214 reads results from completed instructions from the common data bus 222 and writes the results to memory via the data cache 220 for store instructions.

The instruction execution pipeline 200 executes some instructions speculatively. Speculative execution means that the instruction execution pipeline 200 performs at least some operations for execution of the instruction, but maintains the ability to reverse the effects of such execution in the event that the instruction was executed incorrectly.

In an example, the instruction execution pipeline 200 is capable of performing branch prediction. Branch prediction is an operation in which the instruction fetch unit 204 predicts the control flow path that execution will flow to and fetches instructions from that path. There are many ways to make the prediction, and some involve maintaining global or address-specific branch path histories (e.g., histories of whether branches are taken or not taken and/or the targets of such branches), and performing various operations with such histories. The execution pipeline (e.g., the functional units 216) actually executes branches to determine the correct results of such branches. While instructions from the predicted execution path are executing but before the functional units 216 actually determines the correct execution path, such instructions are considered to be executing speculatively, because it is possible that such instructions should not actually be executed. There are many other reasons why instructions could execute speculatively.

It is possible to execute store instructions speculatively. Speculative execution occurs by performing various operations for an instruction but not committing such operations until the instruction becomes non-speculative. In an example, executing a store instruction speculatively includes placing the instruction into a load/store unit 214, determining the data to store, and determining an address to store the data to (which may involve address calculation and translation). During the time that such instruction is being speculatively executed, the reorder buffer 210 holds the store instruction and does not permit the instruction to retire—commit the results—until the store instruction becomes non-speculatively executing. In the branch prediction example, the store instruction becomes non-speculative when the execution pipeline 200 confirms that the predicted control flow path, which the store instruction is within, is the correct control flow path (e.g., by the functional units 216 executing the branch instruction and determining that the control flow path predicted by the instruction fetch unit 204 is the actual control flow path indicated by the now-executed branch instruction).

Instructions could execute speculatively for a variety of reasons such as executing in a predicted branch control flow path or for a variety of other reasons. Part of the execution of a store instruction involves writing the data to be stored into a cache. To do this, a cache controller gains exclusive access to the appropriate cache line and then writes the specified data into that cache line. Gaining exclusive access to the appropriate cache line involves causing other caches (e.g., all other caches that are not hierarchically above the cache) to invalidate their copies of the cache line. Doing this prevents conflicting versions of data for that cache line from existing in different cache memories. In the MESI ("modi-fied, exclusive, shared, invalid") protocol, the instruction execution pipeline 200 that executes the store gains exclusive access to the cache line and the other units set their copy of the cache line to be invalid.

The instruction execution pipeline 200 is an out-of-order execution pipeline that attempts to perform various operations for instructions early. One example of such an operation is the invalidation described above. Specifically, for execution of a store instruction, the instruction execution pipeline 200 is permitted to, and often does, request invalidation of other memories' copies of the cache line early on in the execution of a store instruction, so that when the store instruction is ready to write the associated data, the instruction execution pipeline 200 does not need to wait as long as if the invalidation were to occur at a later time. An issue arises, however, where speculative execution of a store instruction occurs. Specifically, as described above, it is possible for the instruction execution pipeline 200 to request invalidation of cache lines for a speculatively executing store instruction, and to make such request substantially before the store instruction is ready to write data. However, it is possible that the speculative execution of the store instruction is incorrect. For example, it is possible that the store instruction was executing on an incorrectly predicted control flow path (such as past the branch not-taken point where the branch is actually taken). In this case, the act of causing the various copies of the cache line involved to be invalidated from the various memories is wasted, and those various memories may need to reacquire those cache lines in shared or exclusive state.

For at least this reason, an operation referred to as "usage-based fill request weakening" is presented herein. According to this operation, in the event that a cache line is stored into a cache as the result of a speculative store, a controller such as a cache controller, or other entity, records, in a metadata memory, that the cache line is stored into the cache as the result of a speculative store. In the event that the cache line is converted to an invalid state or a shared state due to a probe from a different core, the controller records that the cache line is "problematic." Subsequently, if the core later executes a speculative store instruction that stores to the cache line deemed as problematic, the core does not cause the cache line to be invalidated in other caches (e.g., caches for parallel processing cores), for the speculative store instruction. The cache line is later invalidated in the other caches in the event that execution of the store instruction becomes non-speculative. Additional details are now provided.

Figure 3:
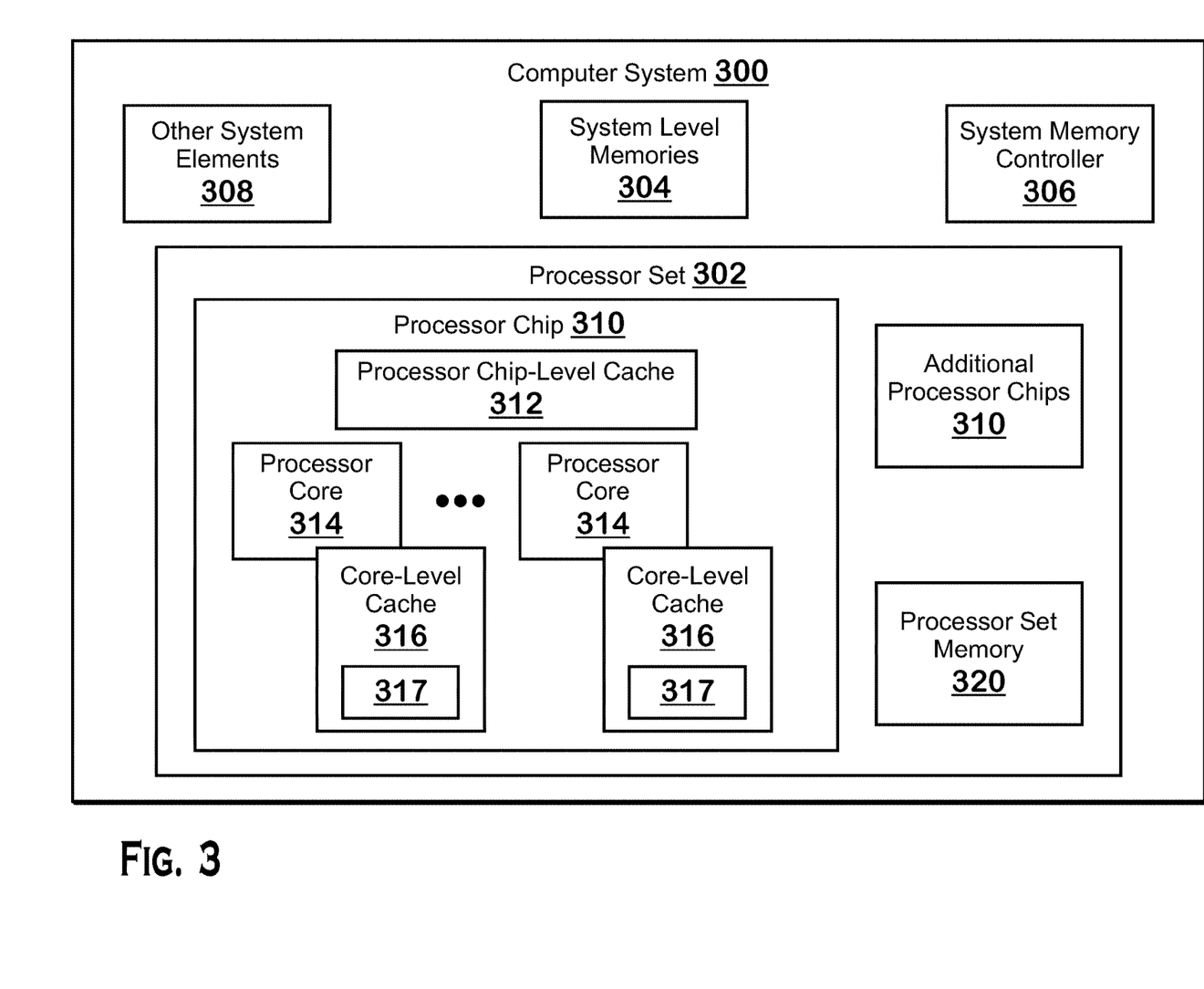
FIG. 3 is a block diagram of a computer system, according to an example.

FIG. 3 is a block diagram of a computer system 300, according to an example. In some examples, the computer system 300 is the computer system 100 of FIG. 1. The computer system 300 includes a processor set 302, one or more system-level memories 304, a system memory controller 306, and other system elements 308.

The processor set 302 includes one or more processor chips 310. Each processor chip 310 includes a processor chip-level cache 312 and one or more processor cores 314. Each processor core 314 has an associated core-level cache 316. Each of the processor cores 314 includes one or more execution pipelines such as the instruction execution pipeline 200 of FIG. 2.

The caches and memories illustrated in FIG. 3 operate in parallel and therefore use a coherence protocol to ensure data coherence. One example of such a protocol is the modified-exclusive-shared-invalid ("MESI") protocol. Each cache line includes an indication of one of these four states. The modified state indicates that the copy of the cache line stored in a particular cache is modified with respect to the copy stored in a backing memory, and thus that the cache line must be written to the backing memory when the cache line is evicted. The exclusive state indicates that the cache line is stored in a particular cache and not in any other cache at the same level of the hierarchy. It should be noted that a cache line that is marked as exclusive can be stored in a higher level of the hierarchy. For example, a cache line stored in a level 0 cache in an exclusive state can also be stored in the level 1 cache directly above the level 0 cache. The shared state indicates that the cache line is stored in multiple caches at the same level of the hierarchy. The invalid state indicates that the cache line is not valid within the particular cache where that cache line is marked invalid (although another cache can store a valid copy of that cache line).

Each processor core 314 has an associated core-level cache 316. When a processor core 314 executes a memory operation such as a load operation or a store operation, the processor core 314 determines whether the cache line that stores the data for the memory operation is located within the core-level cache 316 associated with the processor core 314. If such a cache line is not located within the core-level cache 316, then the core-level cache 316 attempts to fetch that cache line into that core-level cache 316 from a higher level cache such as the processor chip-level cache 312. The processor chip-level cache 312 serves both as a higher level cache memory and as a controller that manages the coherence protocol for the processor chip-level cache 312 and all core-level caches 316 within the same processor chip 310. Thus the processor chip-level cache 312 checks itself to determine whether the requested cache line is stored therein for the purpose of providing that cache line to the requesting processor core 314. The processor chip-level cache 312 provides the cache line to the requesting core 314 either from its own contents or once fetched from a memory that is higher up in the hierarchy.

The processor chip-level cache 312 manages the coherence protocol for the core-level caches 316. In general, the processor chip-level cache 312 manages the protocol states of the cache lines within the core-level caches 316 so that if any cache line is in an exclusive state in a particular core-level cache 316, no other core-level cache 316 has that cache line in any state except invalid. Multiple core-level caches 316 are permitted to have the cache line in a shared state.

The protocol works on a level-by-level basis. More specifically, at each level of the memory hierarchy, each element within that level is permitted to have a cache line in some subset of the states of the protocol. In an example, at the level of the processor set 302, each chip 310 (thus, each processor chip-level cache 312) is permitted to have a cache line in one of the states, such as a shared state or an exclusive state. A controller for a particular level of the hierarchy manages the protocol at that level. Thus the processor set memory 320 manages the states of the processor chip-level caches 312. The processor chip-level cache 312 for any particular processor chip 310 manages the states of the core-level caches 316, and a system memory controller 306 manages the states for the processor set 302 and other system elements 308 that may store a particular cache line.

When a processor core 314 executes a store instruction, the processor core 314 requests that the cache line that includes the data to be written to is placed into the associated core-level cache 316 in an exclusive state. If the cache line is already in the cache and is not in an exclusive state, then the request is a request to convert that cache line to an exclusive state. If the cache line is not in the cache, then the request is a request to load the cache line into the cache and to have that cache line be in an exclusive state in the cache. Part of satisfying this request involves requesting that the all other caches (other than the caches that are "hierarchically above" the core-level cache 316) that store a copy of the cache line invalidate their copy of that cache line. A first cache is "hierarchically above" a second cache if misses in the second cache are serviced from the first cache or from a cache that is hierarchically above the first cache.

In the event that the store instruction is executing speculatively, the controller (e.g., the cache controller of the core-level cache 316) checks a metadata memory (e.g., metadata memory 317) to determine whether the cache line that is requested to be stored to is marked as "problematic." If the cache line is not marked as "problematic," then the controller issues a request to the rest of the hierarchy to invalidate the cache line. The "rest of the hierarchy" includes, for example, each of the core-level caches 316, each processor chip-level cache 312, system level memories 304, and other system elements 308, although memories and caches that are "hierarchically above" the core-level cache 316 making the request do not necessarily invalidate those copies, since those memories and caches act as backing memories to the core-level cache 316. The elements that receive the request, in response to receiving the request, invalidate their copies of the cache line. If the cache line is marked as "problematic," then the controller does not issue such an invalidation request while the store instruction is speculatively executing, and issues such an invalidation request in response to the store instruction becoming non-speculatively executing. If the store instruction that targets a "problematic" cache line never becomes non-speculatively executing (e.g., because execution of the store instruction is not correct), then the controller does not issue such an invalidation request for the store instruction.

The cache controller does not use the metadata memory 317 to determine whether to perform the above invalidation for a store instruction that is not executing speculatively. The controller issues a request to the rest of the hierarchy to invalidate the cache line for such a store instruction, regardless of the contents of the metadata memory 317.

When a cache line is placed into the cache (e.g., the core-level cache 316), or when the coherence state of a cache line already in the cache is changed to exclusive, the cache controller determines whether this action occurs as the result of a speculatively executing store instruction. In the event that this action occurs as the result of a speculatively executing store instruction, the cache controller places information (an "entry") into the metadata memory 317 that includes an indication of the cache line. The cache controller tracks the cache line to determine whether the cache line stops being exclusive before the cache line is written to (e.g., whether the cache line becomes "invalid" or "shared" before the coherence state of the cache line becomes "modified," in the MESI protocol). In the event that the cache line is placed into the cache as the result of a non-speculatively executing store instruction, the cache controller does not update the metadata memory 317 for the cache line (no entry is created if no entry exists for the cache line, or the entry is not updated if an entry exists for the cache line).

In the event that a cache line is in an exclusive state in the cache and is tracked by the metadata memory 317, if the cache line becomes invalidated or is converted to a shared state, the cache controller marks the cache line as "problematic." In the event that the cache line is converted to a modified state before being invalidated or converted to a shared state, the cache controller marks the cache line as not problematic. The cache controller maintains the metadata information for the cache line even after the cache line becomes invalidated or is evicted or removed from the cache for some other reason. As described elsewhere herein, in the event that a store instruction is executing speculatively, the cache controller uses the "problematic" or "not problematic" indication to determine whether to issue invalidation requests to other caches.

The operations described above, with respect to FIG. 3, involve placement of a cache line into a cache. In some examples, this cache is the core-level cache 316 of FIG. 3. In other examples, any technically feasible cache is the cache that stores the cache line.

In various implementations, a "store instruction" is any instruction that writes to memory and thus requires exclusive access to a cache line.

FIGS. 4A-4D illustrate cache operations related to cache lines deemed to be "problematic." In various examples, the metadata memory 404 is the metadata memory 317 illustrated in FIG. 3. In various examples, the processor core 314 is the processor core 314 illustrated in FIG. 3. In various examples, the cache 406 is a core-level cache 316 of FIG. 3. In various examples, the controller 402 is a cache controller for the core-level cache 316.

Figure 4A:
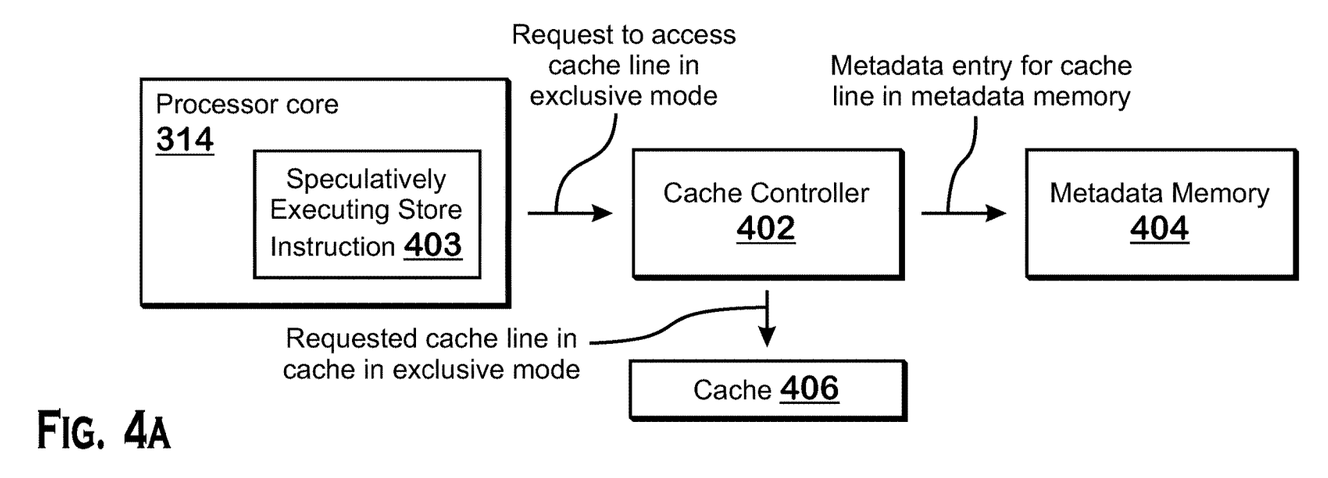
FIGS. 4A-4D illustrate cache operations related to cache lines deemed to be "problematic," according to examples.

FIG. 4A illustrates an operation for placing a metadata entry into the metadata memory 404, according to an example. According to this operation, the processor core 314 is speculatively executing a store instruction 403. In the course of this execution, the processor core 314 requests, from the cache controller 402, access to the cache line in an exclusive mode. The cache controller 402 places the cache line into the cache 406 in an exclusive mode if the cache line is not already in the cache 406, or changes the coherence state of the cache line to exclusive if the cache line is already in the cache 406. Additionally, the metadata memory 404 records that the cache line was brought in as the result of a speculative store.

Above, it is stated that speculative execution of a store instruction sometimes results in a cache line being in the cache 406 in an exclusive state. It should be understood that an instruction often involves a large number of operations, and that for a store instruction to execute, the cache line that includes the data to be written by the store instruction is brought into the cache 406, and that store instructions sometimes result in such a cache line being converted to an exclusive state if necessary. Further, it should be understood that even store instructions that are executing speculatively result in such a cache line being in the cache 406 in an exclusive state. Thus, FIG. 4A illustrates that placement of a cache line into the cache 406 in an exclusive state, as a result of a speculatively executing store instruction, results in the metadata memory 404 indicating that the cache line was brought in as the result of a speculatively executing store instruction.

Figure 4B:
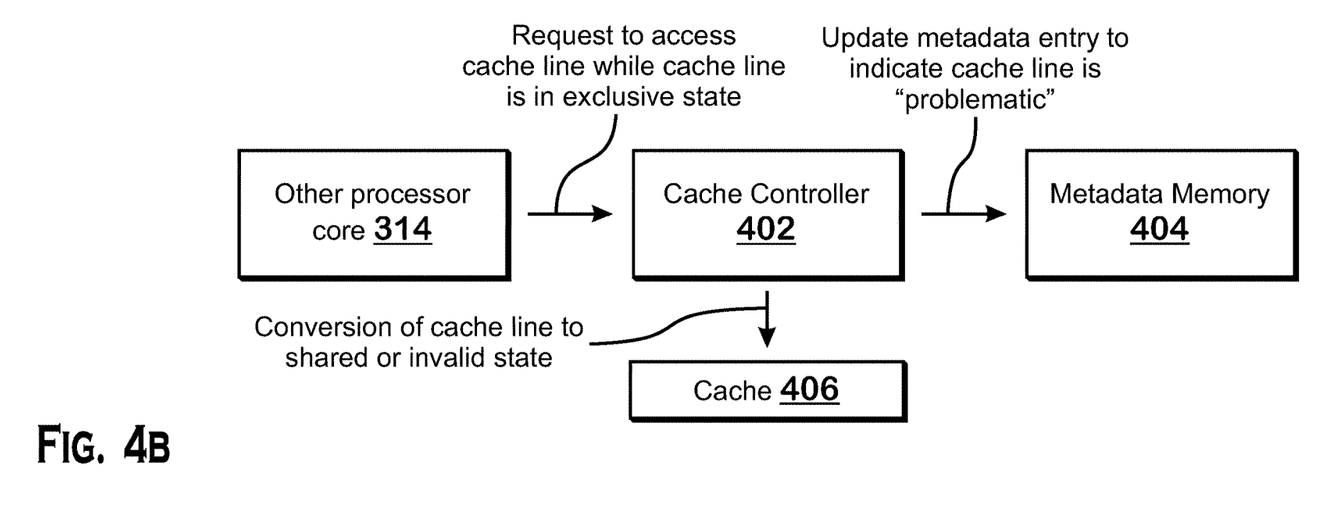

FIG. 4B illustrates an operation for updating the metadata memory 404 based on operations for a cache line. Specifically, in the event that the cache controller 402 detects a request, by a processor core 314 other than the processor that is local to the cache controller 402, to access a cache line, the cache controller 402 updates the metadata memory 404 to indicate that the cache line is considered "problematic." Note that the request is by a processor core other than the processor core that is local to the cache controller 402. In other words, the processor core 314 (a "first processor core 314") whose store instruction resulted in the generation of the entry in the metadata memory 317 is not the processor core 314 (a "second processor core 314") that requests access to the cache line. That processor, the second processor core 314, is requesting access to the cache line before the cache line has been modified by the first processor core. Thus, fetching the cache line into the cache 316 by the first processor core 314 can be considered as too aggressive. More specifically, the cache line was made exclusive as a result of a store instruction. The "purpose" of the store instruction is to write to that cache line, which is why the cache line is made exclusive. However, if the cache line is made non-exclusive before the cache line is made modified, this means that the store instruction was never able to write to the cache line that was brought in, and that the original conversion of that cache line to an exclusive state was too aggressive.

It is stated above that the second processor requests access to the cache line. In some examples, the request includes a request to convert the cache line from a shared state to an invalid state or to a shared state. In some examples, the invalid state occurs in the event that another processor requests the cache line in an exclusive state (e.g., to write), and the shared state occurs in the event that another processor requests the cache line in a shared state (e.g., to read).

Figure 4C:
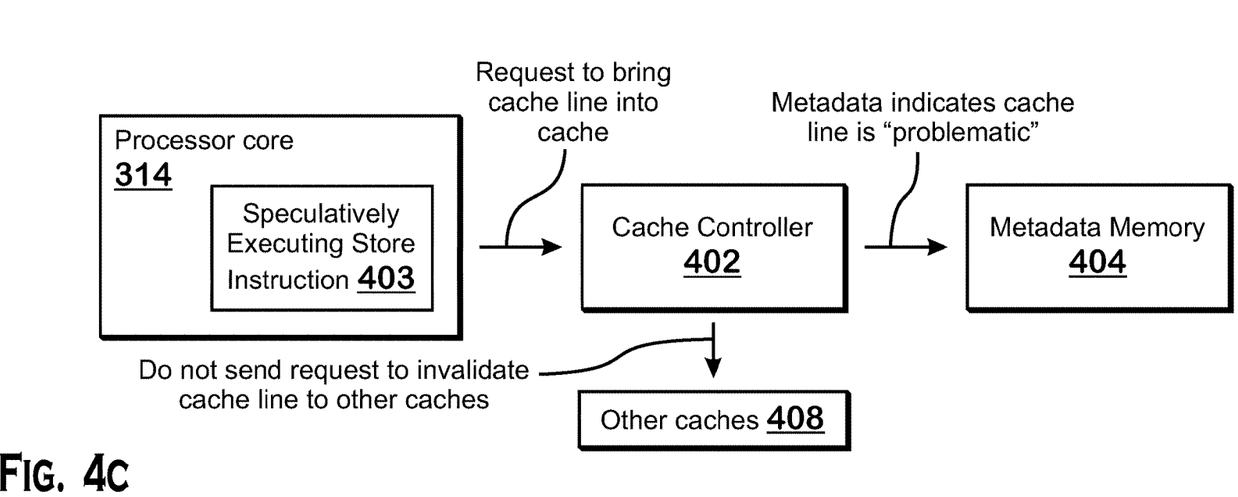

FIG. 4C illustrates an operation in which a store instruction is executing speculatively and is to write to a cache line that is identified as "problematic." As described elsewhere herein, it is possible for the processor core 314, in the course of speculatively executing a store instruction, to cause a cache line to have an exclusive state, where the cache line is to be written by the store instruction. This act provides some performance benefits in the event that execution of the store instruction is determined to be correct and thus the store instruction becomes non-speculatively executing, since the cache line was brought into an exclusive state earlier than if the processor core 314 had waited for the store instruction to be non-speculative. However, if the cache line is considered to be problematic, then the processor core 314 does not issue a request to bring the cache line into an exclusive state by requesting that other caches invalidate their copies of the cache line. This is because an indication that a cache line is problematic is an indication that in the past, the cache line was converted into an exclusive state in the cache 406 due to a speculatively executing store instruction, but was converted to a different state before being written to by the store instruction.

Figure 4D:
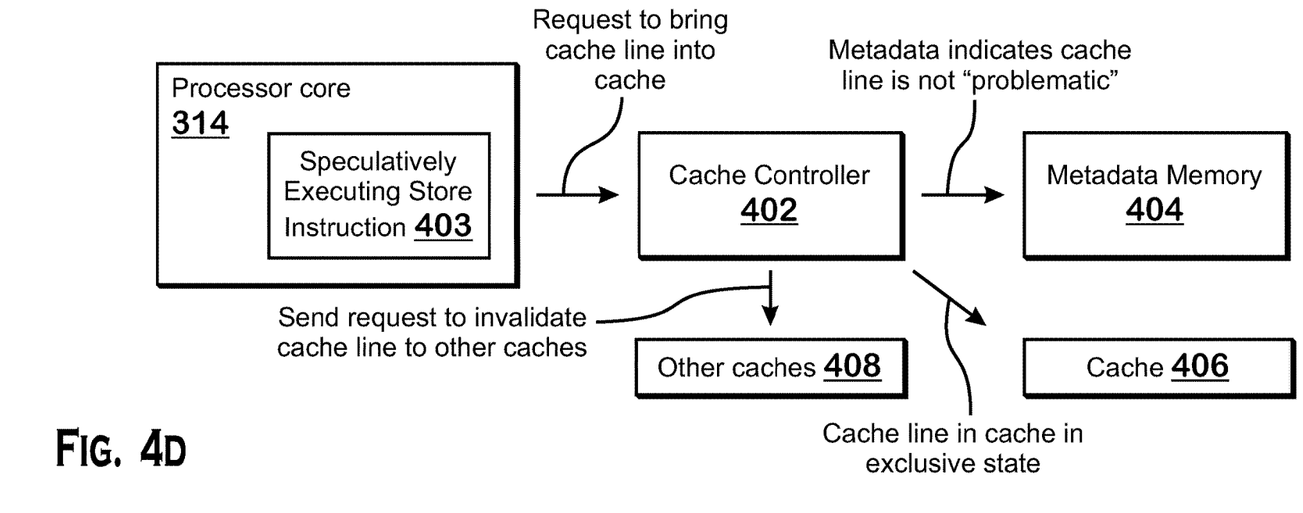

FIG. 4D illustrates an operation in which a store instruction is executing speculatively and is to write to a cache line that is not identified as "problematic." Not being identified as problematic means either that the metadata memory 404 does not include an entry for the cache line or that the metadata memory 404 does include an entry for the cache line, and that entry indicates that the cache line is not problematic. In the event that the cache line is not identified as problematic, the cache controller 402 requests other caches 408 invalidate the cache line and the cache controller 402 brings the cache line into the cache 406 in an exclusive state or converts the cache line to an exclusive state if the cache line is already in the cache 406.

The "other caches 408" illustrated in FIGS. 4C and 4D include caches other than the cache 406 that is local to the processor executing the store instruction, and other than the cache that is hierarchically above the cache 406. The cache controller 402 requests invalidation of the cache line copies in those other caches 408 in order to gain exclusive access to the cache line to be written to. The other caches 408 are thus caches for processors that are executing parallel to the processor core 314 illustrated in FIGS. 4A-4D.

Figure 5:
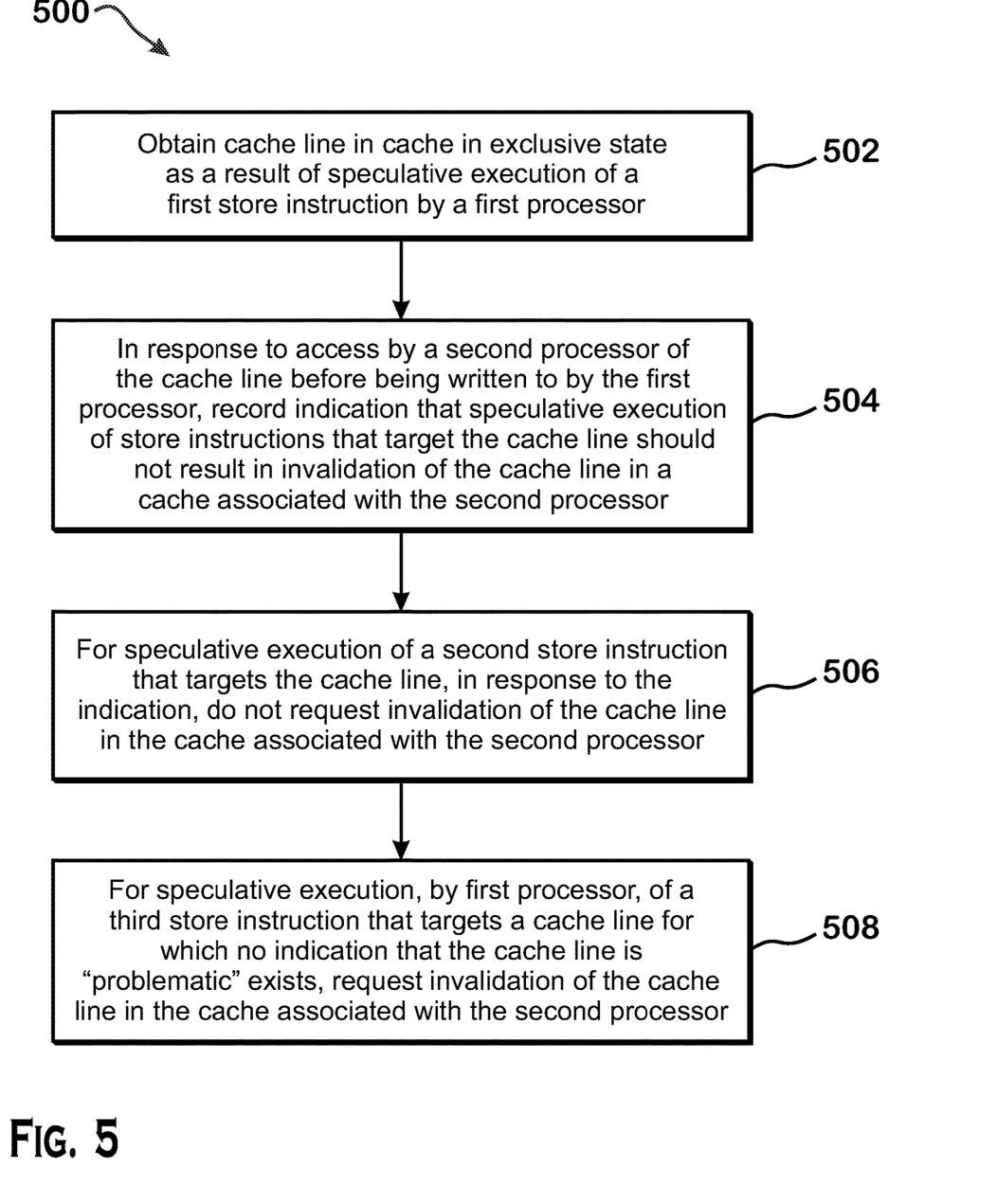
FIG. 5 is a flow diagram of a method for executing store instructions speculatively, according to an example.

FIG. 5 is a flow diagram of a method 500 for executing store instructions speculatively, according to an example. Although described with respect to the system of FIGS. 1-4D, those of skill in the art will understand that any system, configured to perform the steps of the method 500 in any technically feasible order, falls within the scope of the present disclosure.

At step 502, a cache controller 402 obtains the cache line in an exclusive state as a result of speculative execution of a first store instruction by a first processor. More specifically, a first processor (such as processor core 314) speculatively executes a store instruction and, during such execution, obtains the cache line that is the target of the store instruction. The first processor places that cache line into a local cache such as core-level cache 316 and records an indication that the cache line was brought in as the result of a speculative store instruction.

At step 504, in response to an access by a second processor, to the cache line, before the cache line is written to by the first processor, the first processor records an indication that speculative execution of store instructions that target the cache line should not result in invalidation of the cache line in caches associated with processors other than the first processor, such as a second processor. In other words, the first processor 314 records an indication that the first processor should not request invalidation of the cache line in caches other than those associated with the first processor when the first processor speculatively executes a store instruction to the cache line, since the cache line is deemed "problematic." The "other caches" include caches parallel to the cache that is local to the first processor and that any cache that is hierarchically above that cache. In some examples, the indication is recorded in a metadata memory.

At step 506, for speculative execution of a second store instruction that targets the cache line, the first processor does not request invalidation of the cache line in the "other caches," in response to the indication recorded at step 504. At step 508, for speculative execution, by the first processor, of a third store instruction that targets a cache line that does not have the above indication (an indication that the cache line is "problematic"), the first processor requests invalidation of the cache line in the other caches.

It should be understood that many variations are possible based on the disclosure herein. Although features and elements are described above in particular combinations, each feature or element may be used alone without the other features and elements or in various combinations with or without other features and elements.

The various elements illustrated in the Figures are implementable as hardware (e.g., circuitry), software executing on a processor, or a combination of hardware and software. In various examples, each block, such as the processor-memory elements 410, the processor chips 310, the system elements 308, system level memories 304, system memory controller 306, processor chip-level caches 312, processor set memory 320, processor core 314, core-level caches 316, and metadata memory 317, and the illustrated units of the instruction execution pipeline 200 and the computer system 100, are implementable as hardware (e.g., a hardware processor and/or a circuit), software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
in response to an initial speculative execution, setting coherence state for a first cache line to indicate exclusive access for a first processor;
in response to the first cache line being accessed by a second processor before any access by the first processor after setting the coherence state for the first cache line, recording an indication for the first cache line;
detecting speculative execution of a store instruction by the first processor to the first cache line; and
in response to the detecting and the indication, setting or maintaining coherence state for the first cache line to a non-exclusive access state.

2. The method of claim 1, wherein:
the initial speculative execution comprises speculative execution of a second store instruction prior to the store instruction; and
the method further comprises detecting a request to access the first cache line by a second processor before the first processor writes to the first cache line,
wherein recording the indication occurs in response to detecting the request to access the first cache line by the second processor before the first processor writes to the first cache line.

3. The method of claim 2, wherein setting coherence state for the first cache line to indicate exclusive access for the first processor includes storing the first cache line into a first cache associated with the first processor with an exclusive state.

4. The method of claim 2, wherein setting coherence state for a first cache line to indicate exclusive access for a first processor includes changing a coherence state for the first cache line in a first cache associated with the first processor to exclusive.

5. The method of claim 2, wherein setting coherence state for a first cache line to indicate exclusive access for a first processor includes invalidating a copy of the first cache line in a second cache associated with the second processor.

6. The method of claim 2, wherein the access by the second processor is a read or write to the first cache line or a request to change the first cache line to a shared state or an invalid state.

7. The method of claim 2, wherein access by the second processor to the first cache line before the first processor writes to the first cache line occurs in the event that the coherence state of the first cache line becomes invalid or shared before the coherence state of the first cache line becomes modified.

8. The method of claim 1, further comprising:
responsive to the store instruction becoming non-speculatively executing, setting coherence state for a first cache line to indicate exclusive access for the first processor.

9. The method of claim 8, wherein setting coherence state for a first cache line to indicate exclusive access for the first processor includes causing a copy of the first cache line in a second cache associated with a second processor to be invalidated.

10. A system, comprising:
a first cache; and
a cache controller configured to:
in response to an initial speculative execution, set coherence state for a first cache line to indicate exclusive access for a first processor;
in response to the first cache line being accessed by a second processor before any access by the first processor after setting the coherence state for the first cache line, record an indication for the first cache line;
detect speculative execution of a store instruction by the first processor to the first cache line; and
in response to the detecting and the indication, set or maintain coherence state for the first cache line to a non-exclusive access.

11. The system of claim 10, wherein:
the initial speculative execution comprises speculative execution of a second store instruction prior to the store instruction; and
the cache controller is further configured to detect a request to access the first cache line by a second processor before the first processor writes to the first cache line,
wherein recording the indication occurs in response to detecting the request to access the first cache line by the second processor before the first processor writes to the first cache line.

12. The system of claim 11, wherein setting coherence state for the first cache line to indicate exclusive access for the first processor includes storing the first cache line into the first cache with an exclusive state.

13. The system of claim 11, wherein setting coherence state for a first cache line to indicate exclusive access for a first processor includes changing a coherence state for the first cache line in the first cache to exclusive.

14. The system of claim 11, wherein setting coherence state for a first cache line to indicate exclusive access for a first processor includes invalidating a copy of the first cache line in a second cache associated with the second processor.

15. The system of claim 11, wherein the access by the second processor is a read or write to the first cache line or a request to change the first cache line to a shared state or an invalid state.

16. The system of claim 11, wherein access by the second processor to the first cache line before the first processor writes to the first cache line occurs in the event that the coherence state of the first cache line becomes invalid or shared before the coherence state of the first cache line becomes modified.

17. The system of claim 10, wherein the cache controller is further configured to:
responsive to the store instruction becoming non-speculatively executing, set coherence state for a first cache line to indicate exclusive access for the first processor.

18. The system of claim 17, wherein setting coherence state for a first cache line to indicate exclusive access for the first processor includes causing a copy of the first cache line in a second cache associated with a second processor to be invalidated.

19. A system, comprising:
a first cache associated with a first processor;
a second cache associated with a second processor; and
a cache controller configured to:
in response to an initial speculative execution, set coherence state for a first cache line to indicate exclusive access for a first processor;
in response to the first cache line being accessed by a second processor before any access by the first processor after setting the coherence state for the first cache line, record an indication for the first cache line;
detect speculative execution of a store instruction by the first processor to the first cache line; and
in response to the detecting and the indication, set or maintain coherence state for of the first cache line to a non-exclusive access state.

20. The system of claim 19, wherein:
the initial speculative execution comprises speculative execution of a second store instruction prior to the store instruction; and
detect a request to access the first cache line by a second processor before the first processor writes to the first cache line,
wherein recording the indication occurs in response to detecting the request to access the first cache line by the second processor before the first processor writes to the first cache line.

* * * * *